United States Patent
Aharchaou et al.

(10) Patent No.: US 12,050,295 B2
(45) Date of Patent: Jul. 30, 2024

(54) BANDWITH EXTENSION OF GEOPHYSICAL DATA

(71) Applicant: ExxonMobil Technology and Engineering Company, Spring, TX (US)

(72) Inventors: Mehdi Aharchaou, The Woodlands, TX (US); Anatoly Baumstein, Houston, TX (US); Junzhe Sun, San Jose, CA (US); Rongrong Lu, The Woodlands, TX (US); Erik Neumann, Houston, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 867 days.

(21) Appl. No.: 17/247,501

(22) Filed: Dec. 14, 2020

(65) Prior Publication Data

US 2021/0215841 A1    Jul. 15, 2021

Related U.S. Application Data

(60) Provisional application No. 62/959,352, filed on Jan. 10, 2020.

(51) Int. Cl.
*G01V 1/28* (2006.01)
*E21B 47/002* (2012.01)
(Continued)

(52) U.S. Cl.
CPC .......... *G01V 1/30* (2013.01); *E21B 47/0025* (2020.05); *E21B 49/00* (2013.01); *G01V 1/282* (2013.01);
(Continued)

(58) Field of Classification Search
CPC .......... G01V 1/30; G01V 1/282; G01V 1/345; G01V 1/3843; G01V 1/366;
(Continued)

(56) References Cited

U.S. PATENT DOCUMENTS

| 11,437,026 | B1* | 9/2022 | Roshan Ghias | ........ G10L 15/22 |
| 2018/0247636 | A1* | 8/2018 | Arik | ........................ G10L 25/30 |
| 2018/0364384 | A1* | 12/2018 | Beitz | ..................... G01V 1/3861 |
| 2019/0302296 | A1 | 10/2019 | Aharchaou et al. | |
| 2021/0010351 | A1* | 1/2021 | Sun | ........................ G06N 3/045 |

(Continued)

OTHER PUBLICATIONS

Elboth et al. (2009) "Flow and swell noise in marine seismic data", Geophysics vol. 74, Issue 2, pp. Q17-Q25.
(Continued)

*Primary Examiner* — Beau D Spratt
(74) *Attorney, Agent, or Firm* — ExxonMobil Technology and Engineering Company—Law Departmant

(57) ABSTRACT

A methodology for extending bandwidth of geophysical data is disclosed. Geophysical data, obtained via a towed streamer, may have significant noise in a certain band (such as less than 4 Hz), rendering the data in the certain band unreliable. To remedy this, geophysical data, from a band that is reliable, may be extended to the certain band, resulting in bandwidth extension. One manner of bandwidth extension comprises using machine learning to generate a machine learning model. Specifically, because bandwidth may be viewed as a sequence, machine learning configured to identify sequences, such as recurrent neural networks, may be used to generate the machine learning model. In particular, machine learning may use a training dataset acquired via ocean bottom nodes in order to generate the machine learning model. After which, the machine learning model may be used to extend the bandwidth of a test dataset acquired via a towed streamer.

17 Claims, 11 Drawing Sheets

(51) Int. Cl.
*E21B 49/00* (2006.01)
*G01V 1/30* (2006.01)
*G01V 1/34* (2006.01)
*G01V 1/38* (2006.01)
*G06N 3/044* (2023.01)
*G06N 3/045* (2023.01)
*G06N 3/08* (2023.01)
*G01V 1/36* (2006.01)

(52) U.S. Cl.
CPC ............ *G01V 1/345* (2013.01); *G01V 1/3843* (2013.01); *G06N 3/044* (2023.01); *G06N 3/045* (2023.01); *G06N 3/08* (2013.01); *E21B 2200/20* (2020.05); *G01V 1/366* (2013.01); *G01V 2210/1423* (2013.01); *G01V 2210/43* (2013.01); *G01V 2210/614* (2013.01)

(58) Field of Classification Search
CPC ....... G01V 2210/1423; G01V 2210/43; G01V 2210/614; E21B 47/0025; E21B 49/00; E21B 2200/20; G06N 3/045; G06N 3/044; G06N 3/08
See application file for complete search history.

(56) References Cited

U.S. PATENT DOCUMENTS

| | | | |
|---|---|---|---|
| 2021/0103065 A1* | 4/2021 | Whitmore, Jr. | G01V 1/282 |
| 2021/0169442 A1* | 6/2021 | Agarwal | A61B 5/7264 |
| 2021/0181362 A1* | 6/2021 | Jiang | G06V 10/82 |
| 2022/0414301 A1* | 12/2022 | Thiruvenkatanathan | E21B 47/107 |

OTHER PUBLICATIONS

Hu, W. et al. (2019) "A progressive deep transfer learning approach to cycle-skipping mitigation in FWI", 89th Annual International Meeting, SEG Technical Program Expanded Abstracts, pp. 2348-2352.

Jin, Y. et al. (2018) "Learn low-wavenumber information in FWI via deep inception-based convolutional networks", 2018 SEG Technical Program Expanded Abstracts 2018, pp. 2091-2095.

Ovcharenko et al. (2019) "Low-frequency data extrapolation using a feed-forward ANN", 80th EAGE Conference and Exhibition, 5pgs.

Sun, H. and L. Demanet (2018) "Low-frequency extrapolation with deep learning", SEG Technical Program Expanded Abstracts, pp. 2011-2015.

* cited by examiner

BANDWITH EXTENSION OF GEOPHYSICAL DATA

CROSS REFERENCE TO RELATED APPLICATION

This application claims the benefit of priority of U.S. Provisional Application No. 62/959,352, filed Jan. 10, 2020, the disclosure of which is incorporated herein by reference in its entirety.

TECHNICAL FIELD

This disclosure relates generally to the field of geophysical prospecting for hydrocarbon management and related data processing. Specifically, exemplary implementations relate to methods and apparatus for extending frequency bandwidth of geophysical data.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Geophysical measurements provide essential information for petroleum exploration. For instance, seismic data collected using towed streamer acquisition may be used to derive subsurface properties, such as velocity or impedance, or may be used to form images of rocks. However, using towed stream acquisition may limit the collected data to a certain bandwidth, such as a range of useful frequencies that are strong enough relative to the noise. This is illustrated in FIG. 1, which shows a diagram 100 of seismic bandwidth that is typically in the range of 4-60 Hz for modern-day streamers.

As one example, for towed streamer data, ultra-low frequencies (e.g., less than 4 Hz) may exhibit weak signal-to-noise (S/N) due to several factors, such as weather-related noise, swell noise and flow noise. Though, these ultra-low frequencies may be crucial for accurate inversion of subsurface properties.

As another example on the other end of the spectrum, high frequencies (e.g., greater than 60 Hz) may likewise be crucial for obtaining high-resolution seismic images. These high frequencies may suffer from a similar issue as the low frequencies in becoming overwhelmed by several noise factors (e.g., earth ambient noise, absorption, etc.) thereby limiting their use.

In this regard, the absence of good quality low and high frequencies from seismic bandwidth impacts the accuracy of all derivative products about the subsurface which aid in the search for oil and gas. In order to obtain these ultra-low frequencies, special acquisition types, such as ocean bottom nodes (OBN) and ultra-shallow tow data (from an ultra-shallow towed streamer), may provide acceptable S/N for the ultra-low frequencies. Extending low frequencies using OBN examples and extending high frequencies using ultra-shallow tow examples are illustrated in FIG. 1. Unfortunately, these special acquisition systems may be extremely costly, which greatly limits their use relative to towed-streamer acquisition. Further, these special acquisition types have been used less and less since the emergence of "broadband seismic", a geophysical area focused on deep tow.

Several ways attempt to extend seismic bandwidth or to reduce the impact of a limited bandwidth. First, new source types have been proposed in order to provide a stronger signal with less environmental impact (e.g., stronger signal from more advanced source types and deeper tow). Second, algorithmic enhancements have been proposed for seismic inversion and imaging techniques, such as advanced regularization schemes, to compensate for the lack of low and high frequencies (e.g., more sophisticated broadband pre-processing techniques and regularization schemes to solve the inverse problem). Third, researchers have attempted to "manufacture" seismic frequencies through machine learning (ML).

SUMMARY

A computer-implemented method for bandwidth extension of geophysical data is disclosed. The method includes: accessing a machine learning model configured to identify one or more correlations between a first frequency band and a second frequency band; accessing measured seismic data from the first frequency band; and predicting frequency response in the second frequency band based on the accessed machine learning model and the measured seismic data.

DESCRIPTION OF THE FIGURES

The present application is further described in the detailed description which follows, in reference to the noted plurality of drawings by way of non-limiting examples of exemplary implementations, in which like reference numerals represent similar parts throughout the several views of the drawings. In this regard, the appended drawings illustrate only exemplary implementations and are therefore not to be considered limiting of scope, for the disclosure may admit to other equally effective embodiments and applications.

Figure 8C:
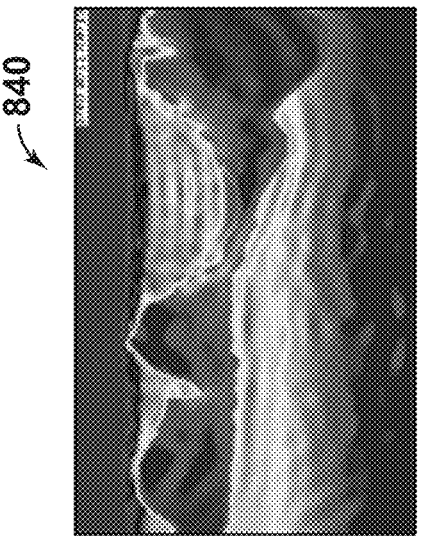
FIGS. 8A-8D relate to a full wavefield inversion (FWI) response to original and manufactured low frequencies, including FIG. 8A being an illustration of a starting Vp model, FIG. 8B being an illustration of the FWI Vp inverted model (iteration 19) based on original low frequencies (with 2 Hz high-cut filter), FIG. 8C being an illustration of the FWI Vp inverted model (iteration 19) based on manufactured low frequencies (with 2 Hz high-cut filter), and FIG.
Figure 8B:
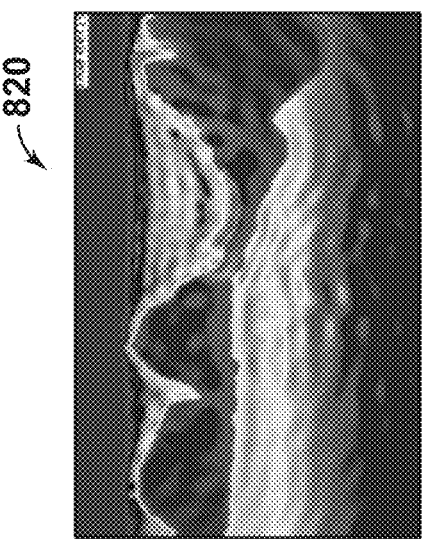

8D being an illustration of the difference between the FWI Vp inverted model in FIG. 8B and the FWI Vp inverted model in FIG. 8C.

Figure 9:
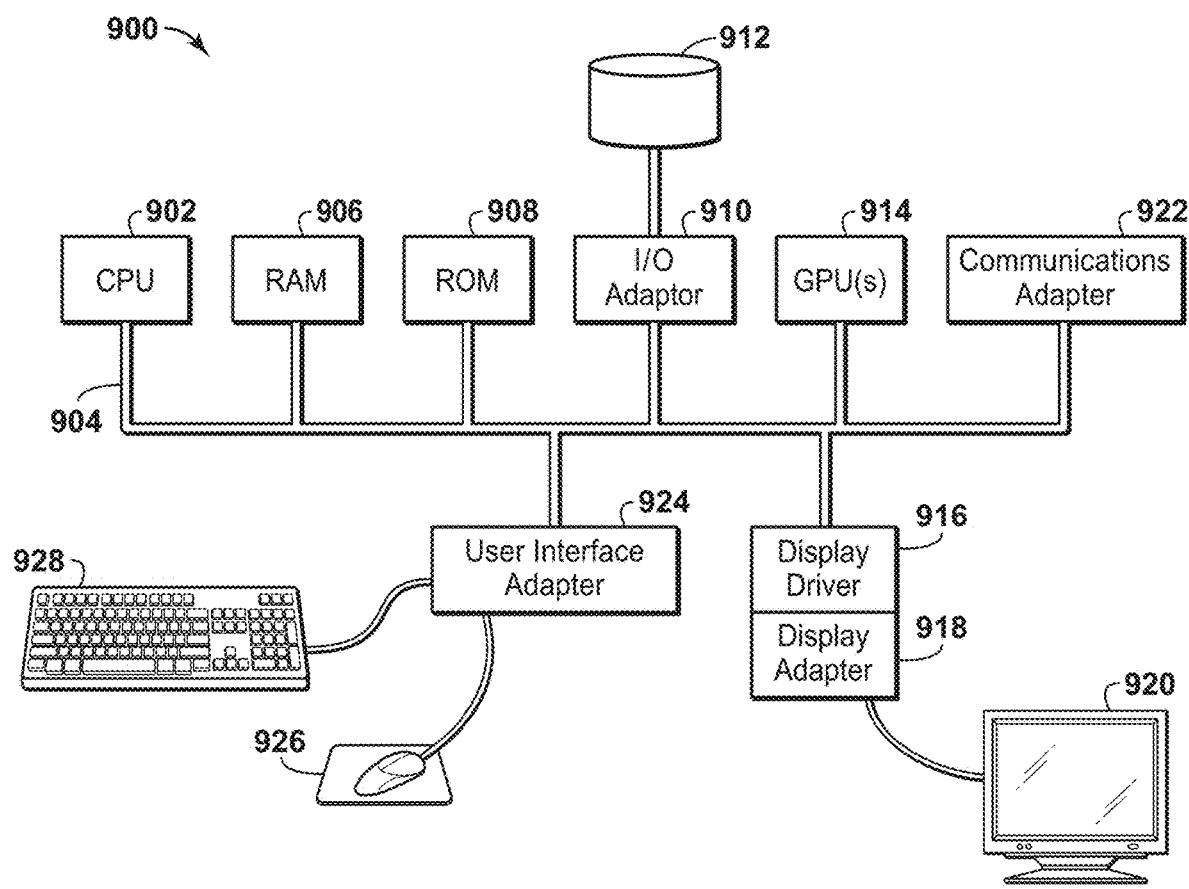

FIG. 9 is a diagram of an exemplary computer system that may be utilized to implement the methods described herein.

DETAILED DESCRIPTION

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation.

The term "seismic data" as used herein broadly means any data received and/or recorded as part of the seismic surveying and interpretation process, including displacement, velocity and/or acceleration, pressure and/or rotation, wave reflection, and/or refraction data. "Seismic data" is also intended to include any data (e.g., seismic image, migration image, reverse-time migration image, pre-stack image, partially-stack image, full-stack image, post-stack image or seismic attribute image) or interpretation quantities, including geophysical properties such as one or more of: elastic properties (e.g., P and/or S wave velocity, P-Impedance, S-Impedance, density, attenuation, anisotropy and the like); and porosity, permeability or the like, that the ordinarily skilled artisan at the time of this disclosure will recognize may be inferred or otherwise derived from such data received and/or recorded as part of the seismic surveying and interpretation process. Thus, this disclosure may at times refer to "seismic data and/or data derived therefrom," or equivalently simply to "seismic data." Both terms are intended to include both measured/recorded seismic data and such derived data, unless the context clearly indicates that only one or the other is intended. "Seismic data" may also include data derived from traditional seismic (i.e., acoustic) data sets in conjunction with other geophysical data, including, for example, gravity plus seismic; gravity plus electromagnetic plus seismic data, etc. For example, joint-inversion utilizes multiple geophysical data types.

The terms "velocity model," "density model," "physical property model," or other similar terms as used herein refer to a numerical representation of parameters for subsurface regions. Generally, the numerical representation includes an array of numbers, typically a 2-D or 3-D array, where each number, which may be called a "model parameter," is a value of velocity, density, or another physical property in a cell, where a subsurface region has been conceptually divided into discrete cells for computational purposes. For example, the spatial distribution of velocity may be modeled using constant-velocity units (layers) through which ray paths obeying Snell's law can be traced. A 3-D geologic model (particularly a model represented in image form) may be represented in volume elements (voxels), in a similar way that a photograph (or 2-D geologic model) is represented by picture elements (pixels). Such numerical representations may be shape-based or functional forms in addition to, or in lieu of, cell-based numerical representations.

Subsurface model is a numerical, spatial representation of a specified region in the subsurface.

Geologic model is a subsurface model that is aligned with specified faults and specified horizons.

Reservoir model is a geologic model where a plurality of locations have assigned properties including any one, any combination, or all of rock type, environment of deposition (EoD), subtypes of EoD (sub-EoD), porosity, permeability, fluid saturations, etc.

For the purpose of the present disclosure, subsurface model, geologic model, and reservoir model are used interchangeably unless denoted otherwise.

Stratigraphic model is a spatial representation of the sequences of sediment and rocks (rock types) in the subsurface.

Structural model or framework results from structural analysis of reservoir based on the interpretation of 2D or 3D seismic images. For examples, the reservoir framework comprises horizons, faults and surfaces inferred from seismic at a reservoir section.

As used herein, "hydrocarbon management" or "managing hydrocarbons" includes any one, any combination, or all of the following: hydrocarbon extraction; hydrocarbon production, (e.g., drilling a well and prospecting for, and/or producing, hydrocarbons using the well; and/or, causing a well to be drilled, e.g., to prospect for hydrocarbons); hydrocarbon exploration; identifying potential hydrocarbon-bearing formations; characterizing hydrocarbon-bearing formations; identifying well locations; determining well injection rates; determining well extraction rates; identifying reservoir connectivity; acquiring, disposing of, and/or abandoning hydrocarbon resources; reviewing prior hydrocarbon management decisions; and any other hydrocarbon-related acts or activities, such activities typically taking place with respect to a subsurface formation. The aforementioned broadly include not only the acts themselves (e.g., extraction, production, drilling a well, etc.), but also or instead the direction and/or causation of such acts (e.g., causing hydrocarbons to be extracted, causing hydrocarbons to be produced, causing a well to be drilled, causing the prospecting of hydrocarbons, etc.). Hydrocarbon management may include reservoir surveillance and/or geophysical optimization. For example, reservoir surveillance data may include, well production rates (how much water, oil, or gas is extracted over time), well injection rates (how much water or $CO_2$ is injected over time), well pressure history, and time-lapse geophysical data. As another example, geophysical optimization may include a variety of methods geared to find an optimum model (and/or a series of models which orbit the optimum model) that is consistent with observed/ measured geophysical data and geologic experience, process, and/or observation.

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

As used herein, terms such as "continual" and "continuous" generally refer to processes which occur repeatedly over time independent of an external trigger to instigate subsequent repetitions. In some instances, continual processes may repeat in real time, having minimal periods of inactivity between repetitions. In some instances, periods of inactivity may be inherent in the continual process.

If there is any conflict in the usages of a word or term in this specification and one or more patent or other documents that may be incorporated herein by reference, the definitions that are consistent with this specification should be adopted for the purposes of understanding this disclosure.

As discussed in the background, machine learning based on supervised learning approaches (such as neural networks) has been used for low frequency extrapolation. However, these supervised learning approaches are focused entirely on feedforward neural networks. Feedforward neural networks are limited in that they have no memory. This is particularly true for sequences in that the feedforward neural networks do not keep track of past elements they have seen.

In contrast to previous solutions, one may view bandwidth extension as a sequence prediction problem where the aim is to harness correlations existing between frequency bands (e.g., sequences of frequencies). In this regard, instead of using a feedforward neural network, one or more recurrent neural networks (RNNs) may be used in order to identify the correlations. Specifically, in one or some embodiments, a machine learning model is generated that identifies one or more correlations between a first frequency band (which includes one or more frequencies) and a second frequency band (which also includes one or more frequencies). In one or some embodiments, the machine learning model may comprise a function or a series of functions. Other manifestations of the machine learning model are contemplated.

In particular, machine learning may identify one or more sequences, embodied within the machine learning model, within one or both of the first frequency band or the second frequency band and/or identify one or more sequences between the first frequency band and the second frequency band. For example, machine learning, in generating the machine learning model, may perform any one, any combination, or all of: identify correlations between frequencies within the first frequency band; identify correlations between frequencies within the second frequency band; or identify correlations between frequencies of the first frequency band and the second frequency band.

Thus, the machine learning may identify the correlations of sequences in order to generate a sequence-to-sequence model. Further, the architecture for the machine learning may be implemented in one of several ways. One way to implement a sequence-to-sequence model is via an encoder-decoder architecture. For example, the encoder is configured to operate over an input sequence of frequencies (such as higher frequencies in the instance of extending low frequencies or such as lower frequencies in the instance of extending high frequencies), one element at a time, and encode correlations existing between its elements into a high-level vector representation. The decoder is configured to predict a sequence of frequencies (such as lower frequencies in the instance of extending low frequencies or such as higher frequencies in the instance of extending high frequencies) conditioned on the high-level vector representation obtained from the encoder. In one or some embodiments, the encoding and decoding processes comprise a "fine-grained" learning of correlations.

As discussed above, machine learning may be configured to extend low frequencies and/or extend high frequencies. For example, in extending to low frequencies, the encoder and decoder may be trained jointly on many pairs of high frequencies (e.g., 4 Hz-8 Hz) and low frequencies (e.g., 1 Hz-3 Hz) extracted from ocean-bottom nodes (OBN) or cables. As another example, in extending to high frequencies, the encoder and decoder may be trained jointly on many pairs of low frequencies (e.g., 56 Hz-60 Hz) and high frequencies (e.g., >60 Hz). By exposing the model to many examples, the high-level vector representation estimated by the encoder may be viewed as summarizing the complexity of the medium (e.g., geology) the network has been exposed to.

Seismic data may be subject to a transformation in order to generate a plurality of sequence elements, which may be used by the encoder and/or decoder to encode/decode correlations existing between the sequence elements. Various types of transformations of the seismic data in order to generate the sequence elements are contemplated.

As one example, a Fourier transform on the seismic data enables transition from the time/space dimension to the frequency/wavenumber dimension. In particular, a frequency representation of 3-D input (e.g., composed of t (time), results in f (frequency), $k_x$ (wavenumber in x), and $k_y$ (wavenumber in y), which are the analogs of the x, y spatial dimensions. Using the Fourier transform, frequency slices are obtained (e.g., fixing f at a certain frequency, such as at 8 Hz) that may comprise a 2-D matrix. In this regard, the Fourier transform results in complex coefficients, which may be represented in one of several ways (e.g., represented in terms of its amplitude and phase; represented in terms of real and imaginary parts; etc.).

Figure 1:
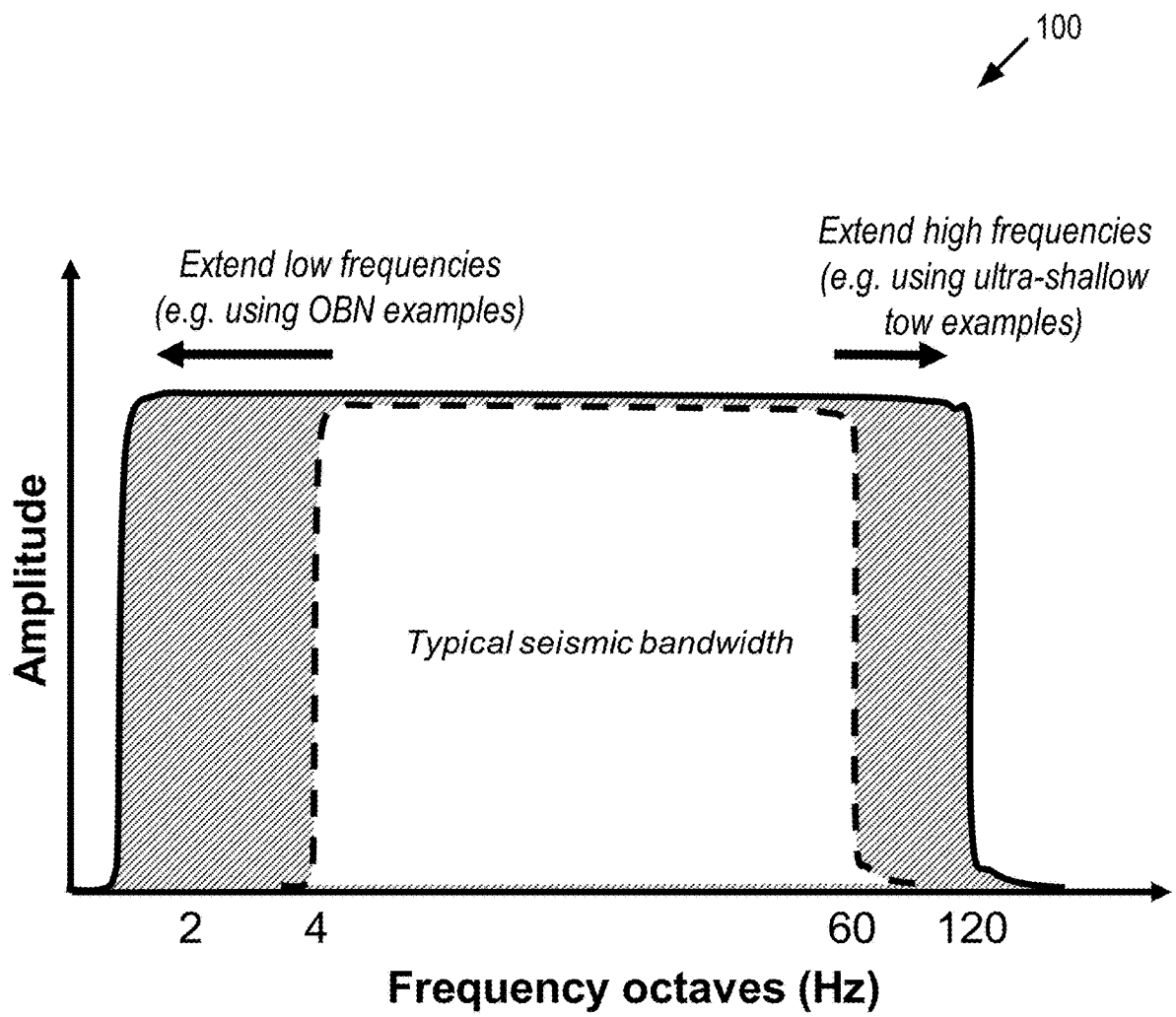
FIG. 1 is a graph of an example of typical seismic bandwidth and extensions at low and high frequencies.

As discussed above, bandwidth extension may extend low frequencies and/or high frequencies, such as illustrated in FIG. 1. In this regard, any discussion regarding bandwidth extension may be applied to either or both of extending low frequencies or high frequencies. Further, various examples of the first frequency band and the second frequency band are contemplated. As one example, the first frequency band (e.g., 4 Hz-8 Hz) may be at higher frequencies than the second frequency band (e.g., 1 Hz-3 Hz) in order to extend frequencies lower than the typical seismic bandwidth. As another example, the first frequency band (e.g., 56 Hz-60 Hz) may be at lower frequencies than the second frequency band (e.g., >60 Hz) in order to extend frequencies higher than the typical seismic bandwidth.

In one or some embodiments, a frequency band may be viewed as a sequence of temporal frequencies, where element(s) share correlations with neighboring element(s). This is, for example, shown in FIG. 2, which is an illustration 200 of a frequency band as a sequence of frequencies. Various frequency elements are contemplated. As one example, the frequency elements comprise frequency slices, such as a f-k representation of seismic data, with correlations identified in a sequence of the frequency slices. Other frequency elements are contemplated.

Figure 2:
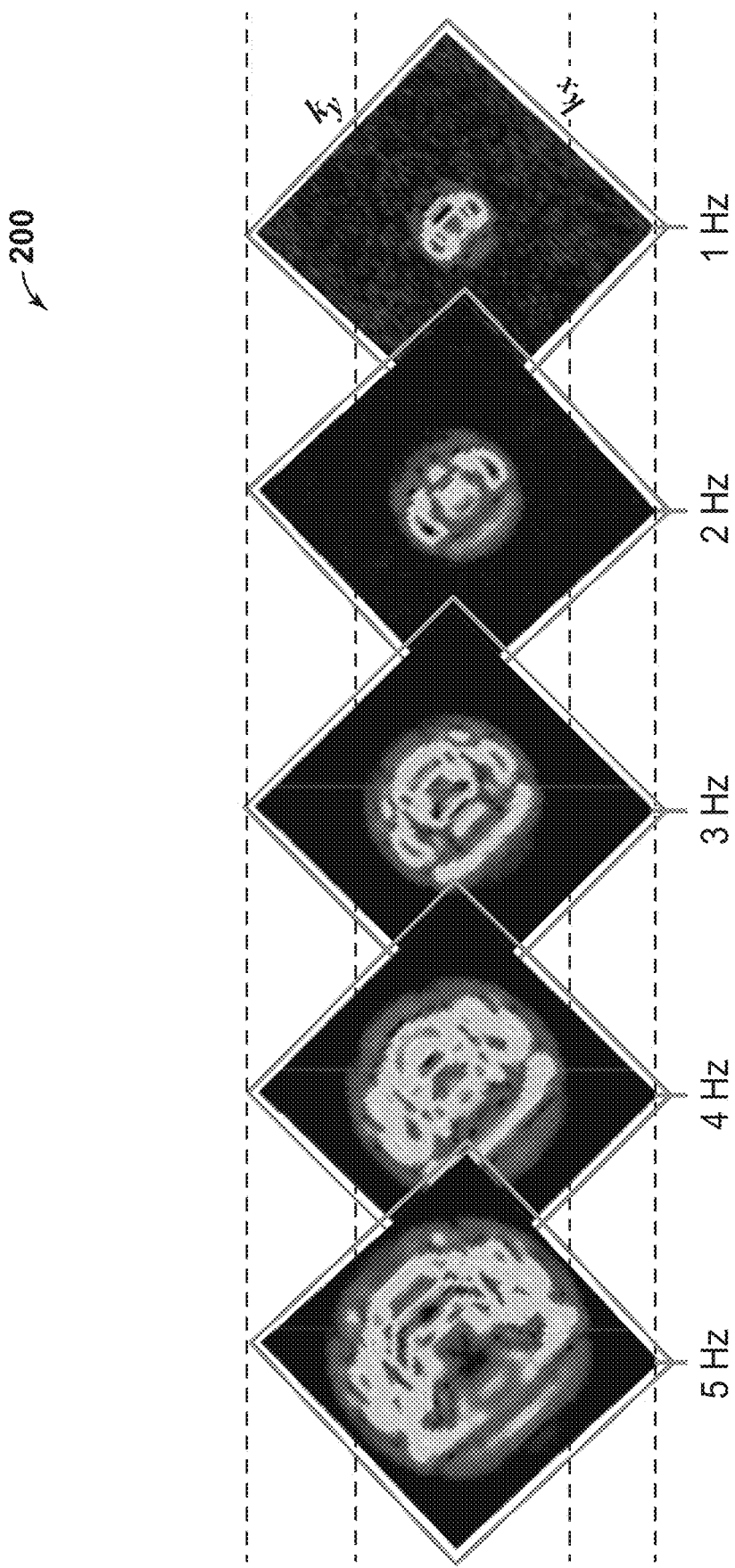
FIG. 2 is an illustration of a frequency band as a sequence of frequencies, such as a f-k representation of seismic data as a sequence of frequency slices.

As shown, frequency slices associated with the discrete frequencies of 1 Hz, 2 Hz, 3 Hz, 4 Hz and 5 Hz are illustrated. Other frequencies for frequency slices are contemplated. For example, the frequency slices may be at integer frequencies (such as shown in FIG. 2). Alternatively, or in addition, other frequencies, such as non-integer frequencies (e.g., decimal frequencies, fractional frequencies) may comprise the frequency slices. As discussed above, low frequencies (e.g., lower than 4 Hz) may be extended. In this regard, FIG. 2 illustrates frequency slices for frequencies in the typical seismic bandwidth (such as illustrated in FIG. 1) and for frequencies outside (such as lower) than the typical seismic bandwidth.

Further, the seismic data may be transformed in a variety of ways in order to perform the analysis of the frequencies as discussed herein. For example, a Fourier transform of the seismic data may be used in order to operate in the frequency-wavenumber domain in which the independent variables are frequency (f) and wavenumber (such as $k_x$ and $k_y$, illustrated in FIG. 2), as discussed above. Other transforms of the seismic data are contemplated.

Thus, in one or some embodiments, the frequency slices may be viewed as a sequence. For example, the frequency slices may be viewed as any one, any combination, or all of: a sequence within the typical seismic bandwidth (such as a sequence between 4 Hz to 5 Hz, 4 Hz to 6 Hz, 4 Hz to 7 Hz, 4 Hz to 8 Hz, 5 Hz to 6 Hz, 5 Hz to 7 Hz, 5 Hz to 8 Hz, 6 Hz to 7 Hz, 6 Hz to 8 Hz, 7 Hz to 8 Hz, etc.); a sequence outside the typical seismic bandwidth (such as a sequence between 1 Hz to 2 Hz, 2 Hz to 3 Hz, 1 Hz to 3 Hz, 4 Hz to 8 Hz, etc.); a sequence between the typical seismic bandwidth and outside the typical seismic bandwidth (such as a sequence between 1 Hz to 4 Hz, 1 Hz to 5 Hz, 1 Hz to 6 Hz, 1 Hz to 7 Hz, 1 Hz to 8 Hz, 2 Hz to 4 Hz, 2 Hz to 5 Hz, 2 Hz to 6 Hz, 2 Hz to 7 Hz, 2 Hz to 8 Hz, etc.).

Similar to language processing (e.g., identifying correlations in words in a sentence) or video processing (e.g., identifying correlations between frames of a video), one or more aspects of the frequency slices may be analyzed for sequence. From a visual inspection of FIG. 2, one may observe that certain features may evidence a certain pattern or are correlated (e.g., in examining the different frequency slices, certain features shrink, certain features grow, or certain features remain constant). These certain features between frequency slices may be identified via machine learning, such as discussed further below, and may be used to extrapolate the bandwidth (e.g., identify correlations in certain features and use those identified correlations to extrapolate those certain features to lower or higher frequencies).

Further, these features may be manifested in the data associated with the frequency slices, such as the matrices associated with the frequency slices. For example, a 2-D matrix (or matrices) for the frequency slice may be generated by the Fourier transform. In particular, the frequency slice may be represented by multiple matrices, such as matrices for the real part and the imaginary part, or matrices for magnitude and phase. Other representations of the frequency slices are contemplated. As discussed in more detail below, the matrices may be subject to machine learning in order to identify and to highlight the correlations/inter-dependencies between the frequency slices. This is in contrast to prior bandwidth extension methodologies, such as feedforward-based methodologies, which did not identify or acknowledge the inter-dependence between the frequencies.

Figure 3A:
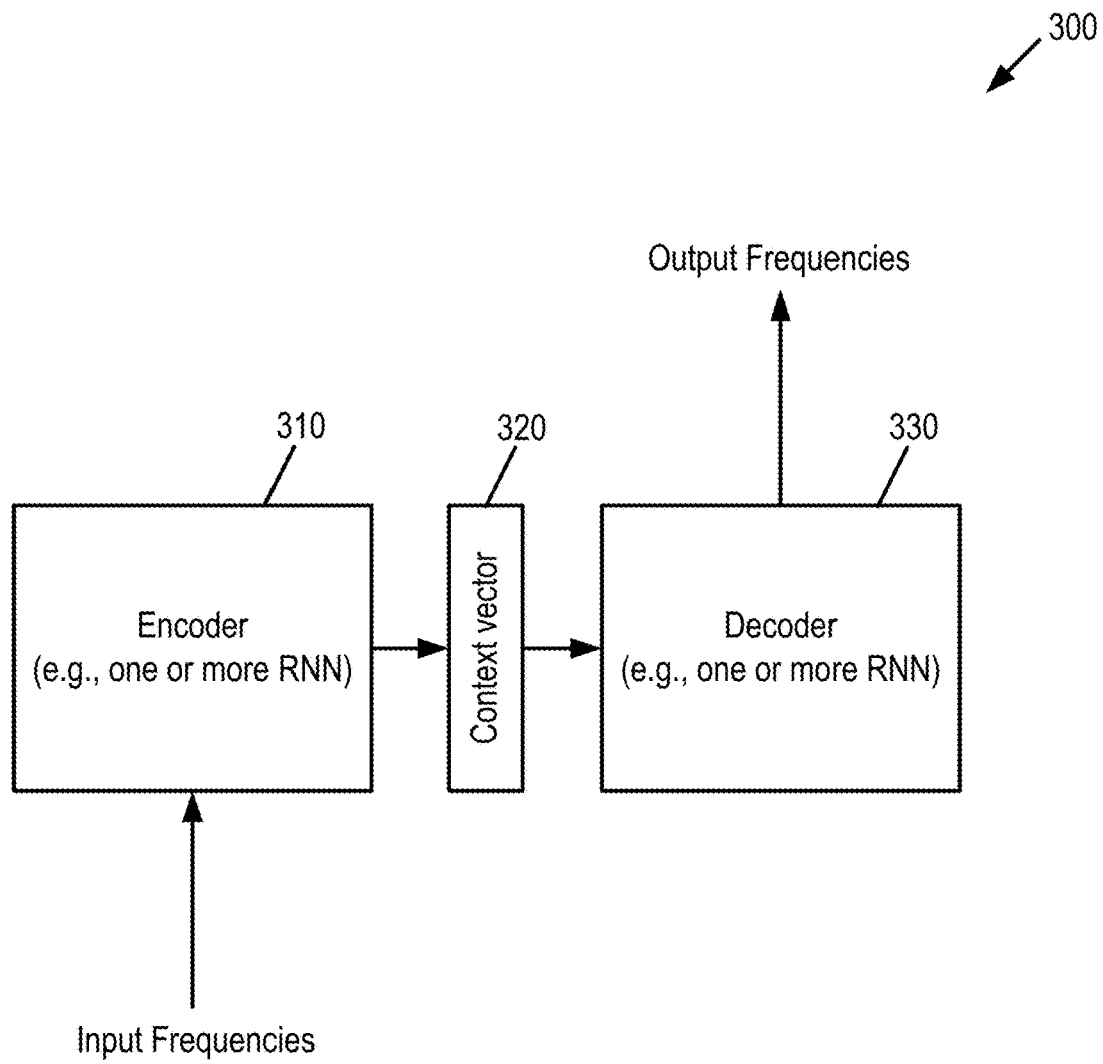
FIG. 3A is a first block diagram of a sequence-to-sequence architecture.

As discussed above, machine learning may be used in order to identify correlations in the frequency band(s). FIG. 3A is a first block diagram 300 of a sequence-to-sequence architecture. Various sequence-to-sequence architectures, such as transformer networks, are contemplated.

The sequence-to-sequence architecture may comprise a neural network-based framework for learning relationships between input and output sequences allowed to vary in length and nature. As discussed above, one or more geophysical datasets may reveal themselves in sequential form. For example, the f-k representation of seismic data may be viewed as a sequence of frequency slices (see FIG. 2), with one, some, or all of the frequency slices sharing correlations with its neighbors, as discussed above. In this regard, the sequence-to-sequence architecture may be trained via supervised machine learning. For example, when training the sequence-to-sequence architecture to extend low frequencies, supervised machine learning aims to train a neural network based on many examples containing both the high frequencies (as input) and the low frequencies (target) with the goal of mapping an input sequence of high frequencies (e.g. 4 Hz-8 Hz) into an output sequence of low frequencies (0.5 Hz-3 Hz). As discussed above, once the neural network is trained, it may be applied on data (e.g., an actual set or test set of data (interchangeably used as actual data or test data) in the high frequencies, such as in the range of 4 Hz to 8 Hz) in order to extend the bandwidth (e.g., to be less than 4 Hz, such as in the range of 0.5 Hz-3 Hz).

Referring back to the figures, FIG. 3A includes an encoder 310 (inputting frequencies), a context vector 320, and a decoder 330 (outputting frequencies). In this way, encoder 310 may map an input sequence of frequencies (e.g. high frequencies) to a fixed-length vector representation (such as context vector 320), and decoder 330 may map the vector representation to a target sequence of frequencies (e.g. low frequencies). The encoder 310 may comprise one or more RNNs, and the decoder 330 may comprise one or more RNNs. As one example, encoder 310 may comprise a single RNN and/or decoder 330 may comprise a single RNN. Alternatively, encoder 310 may comprise multiple RNNs and/or decoder 330 may comprise multiple RNNs. In this regard, a single instance of an RNN may be used for encoder 310 or decoder 330. Alternatively, multiple RNNs may be stacked for encoder 310 or decoder 330.

Further, various types of RNNs are contemplated. One example RNN comprises long short-term memory (LSTM), which may process sequences of data, such as sequences of frequencies. Another example RNN comprises gated recurrent unit (GRU), which is similar to LSTM with a forget gate but includes fewer parameters than LSTM, as it lacks an output gate. In one or some embodiments, an "extension" mechanism may be added at one or both of the encoder or decoder levels to assist in the extrapolation attempt to only some parts of the input sequence, or to extrapolate the output.

The sequence-to-sequence architecture, such as illustrated in FIG. 3A, may be trained using training data. The training data may be selected such that the trained neural network may be used for bandwidth extension for data (such as actual or test data) that is sufficiently similar to the training data. One may consider whether the actual or test data is sufficiently similar to the training data in one of several ways. In one way, it may be assumed that the actual or test data includes features that may be considered a subset of those contained in the training data, thereby enabling the use of the neural network to extend the bandwidth. For example, certain features (e.g., a particular geographical region, a particular type of subsurface, etc.) of the actual or test data may be identified. Thereafter, one of the trained respective neural networks may be selected based on whether the actual data resembles or is similar to a set of training data used to train one of the respective neural networks. In this way, training the neural networks using certain types of training data (e.g., realistic seabed seismic data) may present the advantage of higher-quality labels and therefore potential for higher-fidelity bandwidth extension. For example, towed-streamer data acquired within similar shot coverage may be sufficiently similar to the ocean-bottom nodes. In particular, owing to source-receiver reciprocity, a very sparse set of ocean-bottom nodes deployed randomly may be sufficient for training of the neural network.

Figure 3B:
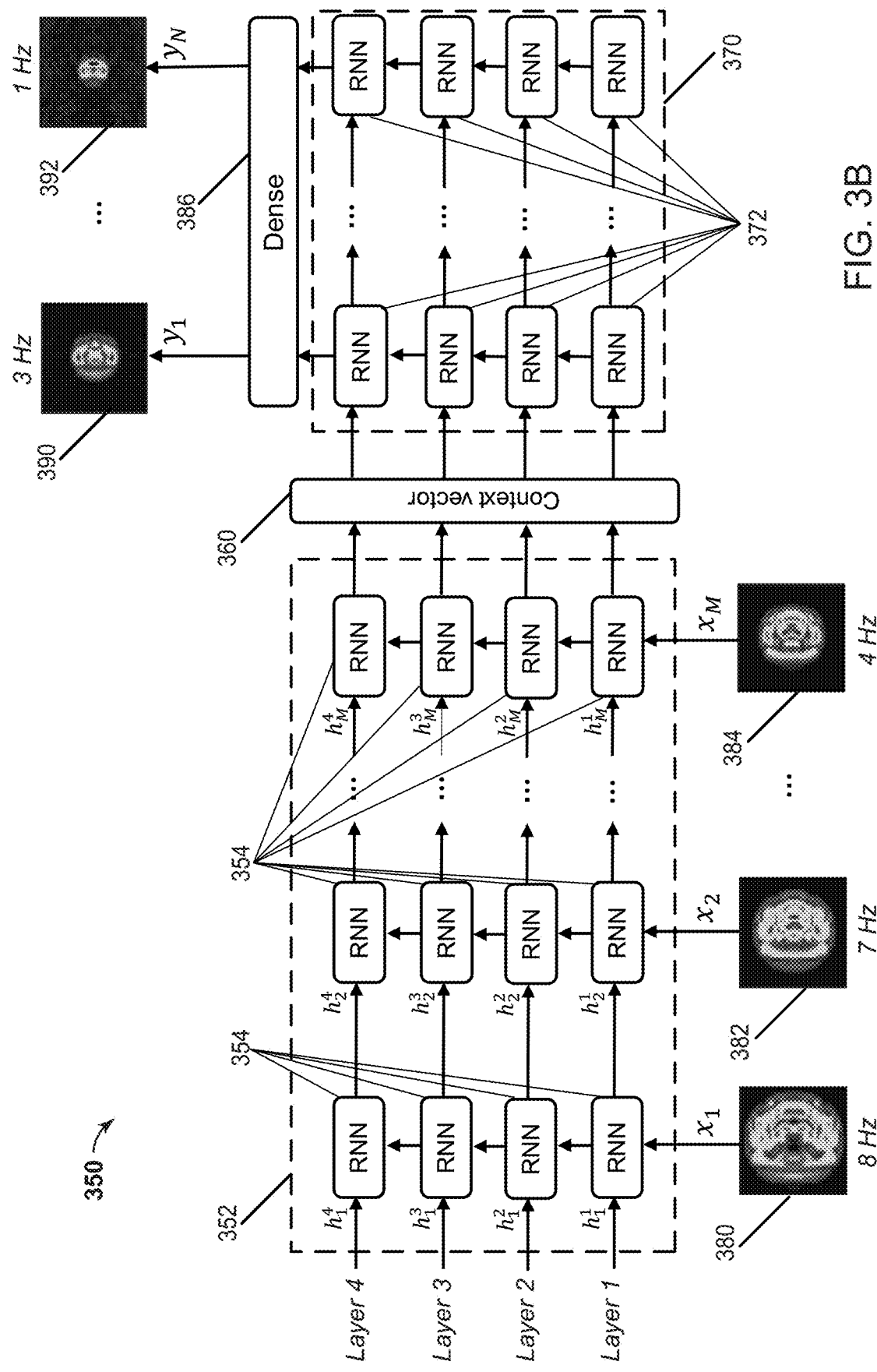
FIG. 3B is a second block diagram of a sequence-to-sequence architecture.

FIG. 3B is a second block diagram 350 of a sequence-to-sequence architecture, which includes an encoder 352, a context vector 360, and a decoder 370. The encoder 352 includes a plurality of RNNs 354 and the decoder 370 includes a plurality of RNNs 372. Encoder 352 receives inputs, such as a plurality of frequency slices (e.g., for 8 Hz (380), 7 Hz (382), to 4 Hz (384)). Decoder 370 generates, via dense 386, outputs, such as a plurality of frequency slices (e.g., for 3 Hz (390) to 1 Hz (392)).

FIG. 3B illustrates unidirectional arrows between the RNNs 354 in encoder 352 and the RNNs 372 in decoder 370. In this way, interdependencies and correlations between frequencies, such as between frequency slices 8 Hz (380), to 7 Hz (382), ... to 4 Hz (384) may be identified and enable encoding fine grain correlations between those frequencies into context vector 360. Alternatively, encoder 352 and/or decoder 370 may use bidirectional arrows between RNNs 354 and/or RNNs 372, respectively, thereby scanning in two directions to gain additional insight and a more informed representation of sequence to encode into the context vector 360.

Further, FIG. 3B illustrates 4 layers in encoder 352 and decoder 370. In one or some embodiments, a single layer may be used. Alternatively, multiple layers, indicative of a deep architecture, may be used in order to encode and/or decode the interdependencies between the frequencies. Various numbers of layers are contemplated, such as less than 4 layers, or greater than four layers (such as at least 10 layers, at least 100 layers, at least 1000 layers, at least 10,000 layers, etc.). For example, stacking multiple LSTMs may give higher representational power at the encoding/decoding levels so that significant uplift in performance may be achieved, thereby allowing the neural network to learn the relationship between the input f-k sequence for each low frequency-wavenumber sample and the output sequence.

As discussed above, an RNN includes memory and is adept at modeling sequence. Manifesting memory in an RNN may be performed in one of several ways, such as including a hidden layer, which may include one or more hidden states (indicative by the $h_y^x$ in FIG. 3B, where the superscript comprises the layer and the subscript is the sequence element).

In effect, the RNN is a densely-connected neural network with a feedback loop. It comprises (or consists of) a hidden state h, known as "memory", operating on a sequence $x=(x_1, \ldots, x_T)$. The element at each time step may be a scalar (containing a single feature) or a tensor of higher dimensionality (containing multiple features). For each index t, the hidden state $h_{(t)}$ is updated by:

$$h_{(t)} = f(h_{(t-1)}, x_t) \tag{1}$$

where f is a non-linear activation function, which may be as simple as a sigmoid function and as complex as an LSTM or GRU unit.

Although usually expressed over time steps, an RNN may deal with sequential data over any dimension where order matters.

As discussed above, the encoder may comprise an RNN that operates on an input sequence x. As it reads each frequency step, the hidden state of the RNN changes according to Equation (1). The update takes into account the step in question and the hidden state computed based on previous frequencies. This allows for "fine-grained" encoding of correlations between neighboring frequencies.

Likewise, the decoder may comprise an RNN trained to generate an output sequence of frequencies by predicting the next element $y_t$ given the hidden state $h_{(t)}$. Unlike the RNN described in the previous section, $h_{(t)}$ is conditioned on $y_{t-1}$ and on the summary C of the input sequence. Hence, the hidden state of the decoder at time t is computed by:

$$h_{(t)} = f(h_{(t-1)}, x_t, c) \tag{2}$$

The goal of the decoder RNN may comprise learning the conditional distribution over a sequence of low frequencies conditioned on a sequence of high frequencies, i.e. $p(y_1, \ldots, y_M | x_1, \ldots, x_N)$, where the lengths M and N of the two sequences are allowed to be different. The encoder and the decoder may be jointly trained in order to maximize the conditional log-likelihood.

$$\max_\theta \frac{1}{N} \sum_{n=1}^{N} \log p_\theta(y_n | x_n) \tag{3}$$

where θ is the set of model parameters and each $(x_n, y_n)$ is an (input sequence of frequencies, target sequence of frequencies) pair extracted from a suitable dataset containing decent signal-to-noise at the target frequency band. For example, OBN data may be used to target low frequencies.

In one or some embodiments, the input sequences and the output sequences to the neural network may be allowed to vary in length (e.g., the frequency input may range from 4 to 8 Hz or from 4 to 9 Hz; the frequency output may range from 0.5 to 3 Hz or from 1 to 3 Hz; etc.). In addition, the number of features contained in each sequence may be allowed to be vary. For example, each matrix coefficient (or a group of matrix coefficients) may comprise a feature. Different matrix configurations associated with the different frequency slices may be indicative of different types of features.

In addition, in one or some embodiments, the RNNs 354, 372 for the encoder 352 and decoder 270 may be trained jointly on several examples in order to maximize the probability of the target frequencies given the input frequencies. By being exposed to several examples, the geologic context vector may mine the complexity of the geologic medium that it has been exposed to through several training examples. The trained network may then be used on data lacking the desirable frequency band, e.g. towed-streamer data missing low frequencies.

Figure 4:
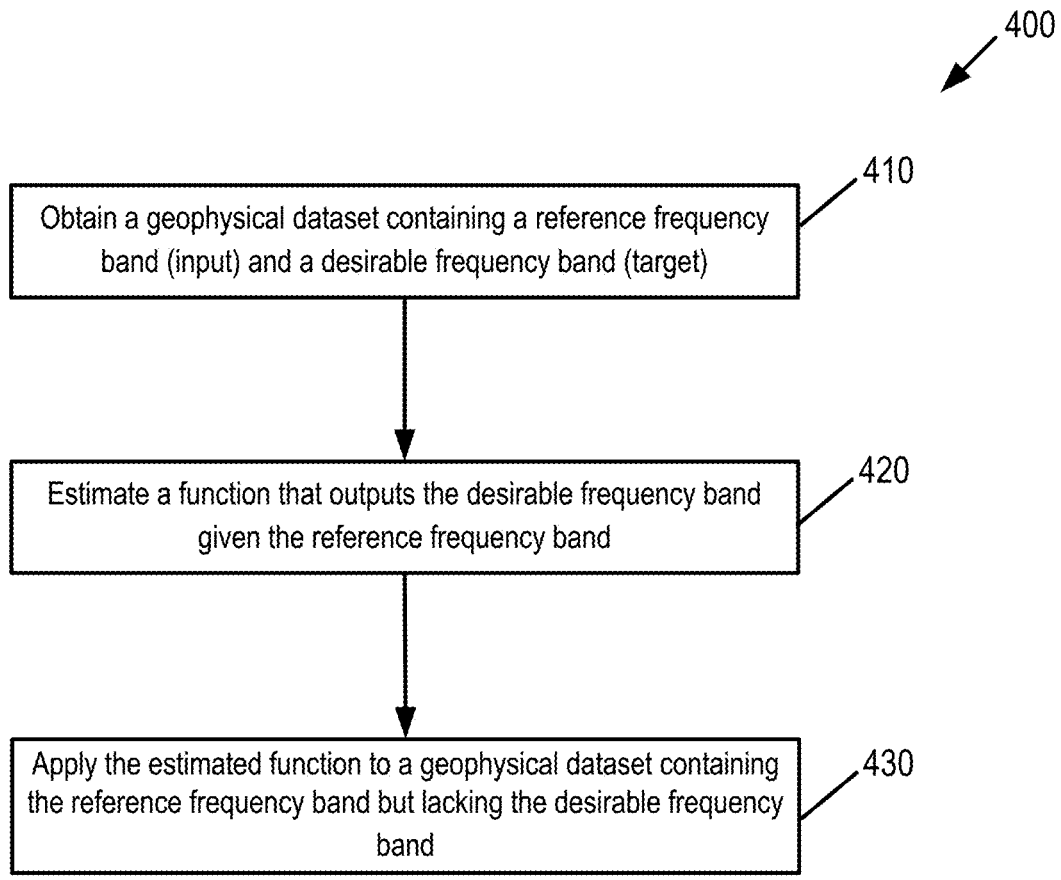
FIG. 4 is a first flow chart of bandwidth extension.

FIG. 4 is a first flow chart 400 of bandwidth extension. At 410, a geophysical dataset is obtained that contains one or more reference frequency bands (as input) and one or more desirable frequency bands (as output or target). As discussed above, geophysical datasets that include data from reference frequency band(s) (e.g., from 4 Hz to 8 Hz; from 56 Hz to 60 Hz) and desirable frequency band(s) may be access for machine learning training (e.g., from 0.5 Hz to 3 Hz; >60 Hz). At 420, the function is estimated that outputs the one or more desirable frequency bands given the one or more reference frequency bands. As discussed above, machine learning, using the training data, may generate the estimated function. At 430, after training to generate the estimated function, the estimated function may be applied to a geophysical dataset containing the reference frequency band but lacking the desirable frequency band. For example, as discussed above, the estimated function may be used to extend the bandwidth (e.g., inputting data for 4 Hz to 8 Hz into the estimated function in order to generate data for 0.5 Hz to 3 Hz).

Figure 5:
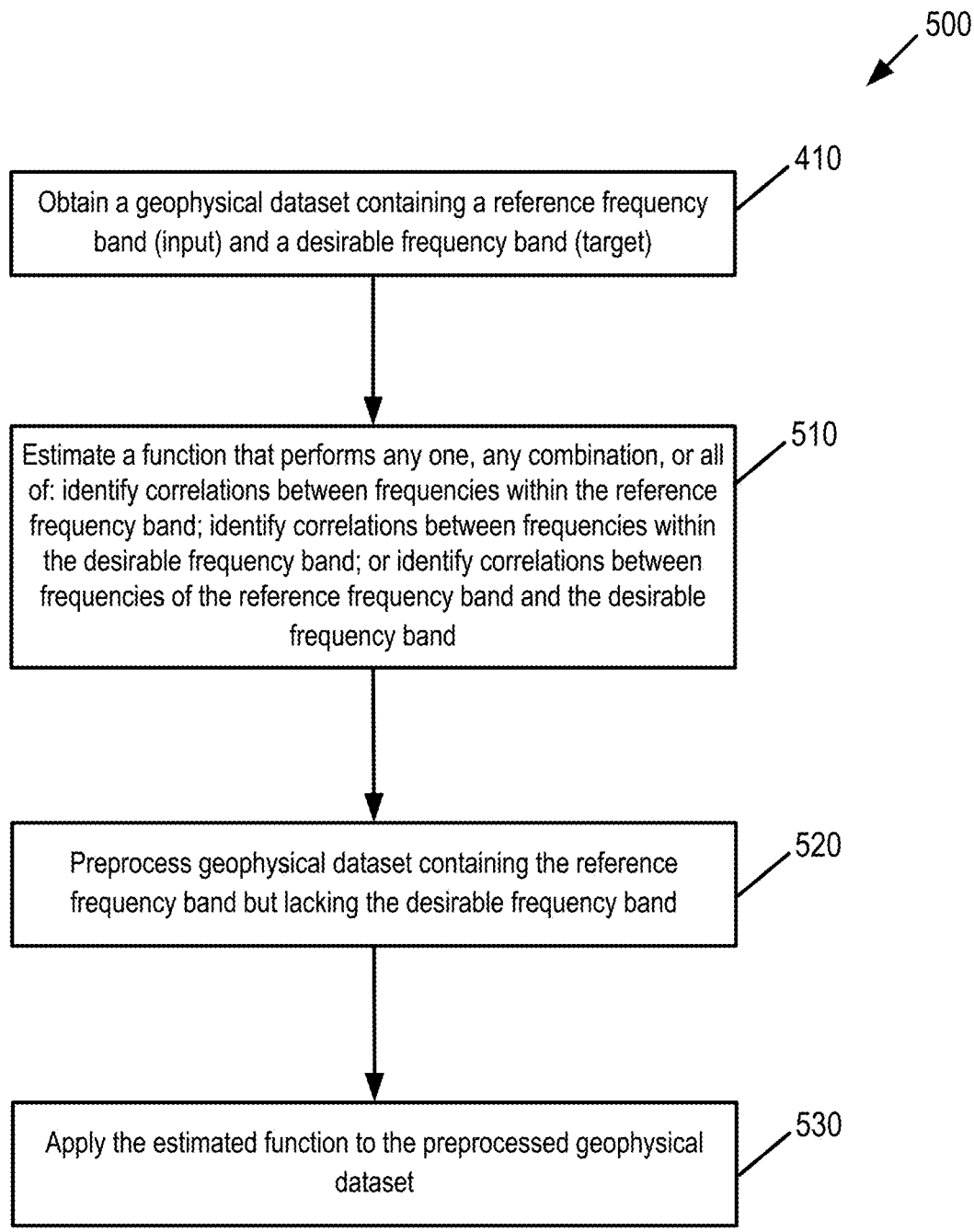
FIG. 5 is a second flow chart of bandwidth extension.

FIG. 5 is a second flow chart 500 of bandwidth extension. Similar to FIG. 4, at 410 a geophysical dataset is obtained containing a reference frequency band (as input) and a desirable frequency band (as the target or output). At 510, a function is estimated that performs any one, any combination, or all of: identify correlations between frequencies within the reference frequency band; identify correlations between frequencies within the desirable frequency band; or identify correlations between frequencies of the reference frequency band and the desirable frequency band. As discussed above, RNNs may be used to encode and decode as a manner in which to generate the estimated function.

At 520, the geophysical dataset, which may comprise the actual or test dataset and contains the reference frequency band but lacks the desirable frequency band, is preprocessed. After which, at 530, the estimated function is applied to extend the bandwidth in the desirable frequency band. In particular, in one or some embodiments, the actual or test dataset may optionally be preprocessed. An example of preprocessing used in a different context is disclosed in US Patent Application Publication No. 2019/0302296, incorporated by reference herein in its entirety. For example, preprocessing may include any one, any combination, or all of: wavefield redatuming; multiple attenuation; or other tools configured to reduce differences between the training dataset and the actual or test dataset (e.g., between the seabed seismic generated by ocean bottom nodes and the towed-streamer data).

As discussed above, the training dataset may be based on OBN whereas the actual dataset or test dataset may be from a towed streamer. In one or some embodiments, the training dataset may be sufficiently large to encompass all features of interest. In such an instance, there may not be a need to reduce differences between the training dataset and the actual or test dataset. In other embodiments, particularly where the training dataset is less encompassing, it may be beneficial to reduce differences (such as by performing preprocessing) between the training dataset and the actual or test dataset.

Figure 6:
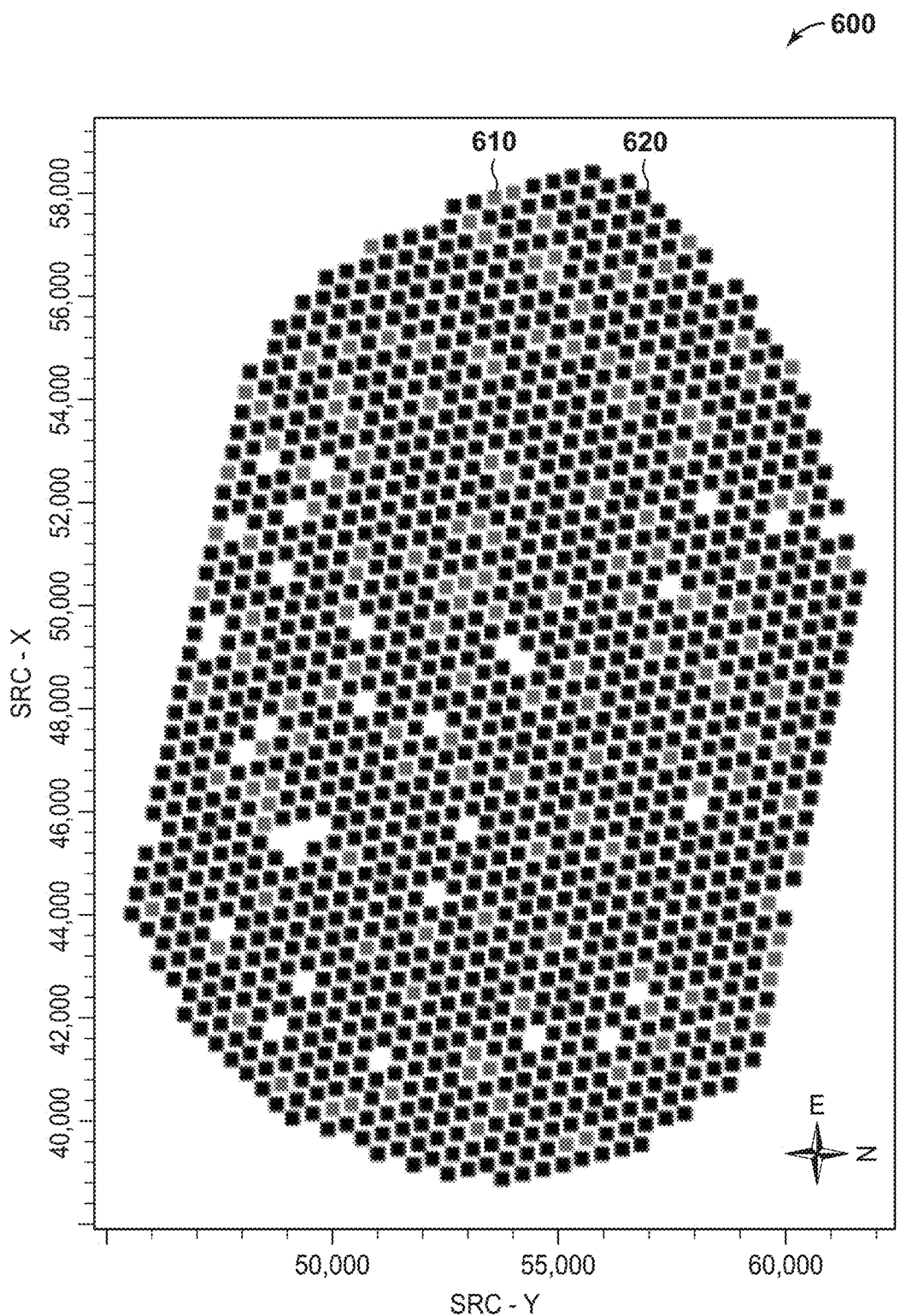
FIG. 6 is an illustration of an ocean-bottom node map with gray nodes used for training and black nodes used for testing.

FIG. 6 is an illustration 600 of an ocean-bottom node map with gray nodes 610 used for training and black nodes 620 used for testing. In particular, feasibility of learning artificial bandwidth extension is tested from seabed seismic on field data comprising 1464 ocean-bottom nodes. Each node records traces from ~300K shots, with wide shot coverage and good S/N down to 1 Hz. As shown in FIG. 6, gray nodes 610, which are approximately 10% of the nodes, form the training data, which comprises pairs of high frequencies (3-6 Hz) and low frequencies (1-3 Hz), amounting to ~45M training samples. It may be determined whether training on only 10% nodes is sufficient in terms of accuracy. Further, it may be determined how full wavefield inversion (FWI) responds to the manufactured low frequencies.

Figure 7C:
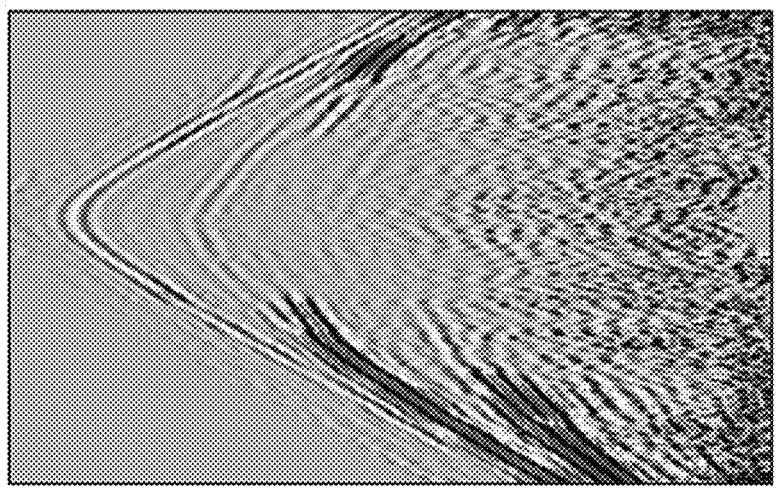
FIGS. 7A-7C relate to manufactured low frequencies for a test node gather, including FIG. 7A being an illustration of input high frequencies (3 Hz-6 Hz), FIG. 7B being an illustration of original low frequencies (1 Hz-3 Hz), and FIG. 7C being an illustration of manufactured low frequencies (1 Hz-3 Hz).
Figure 7B:
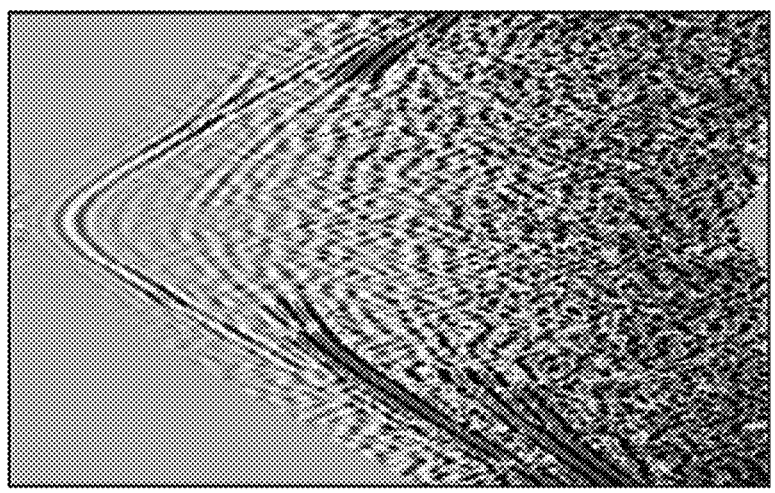
Figure 7A:
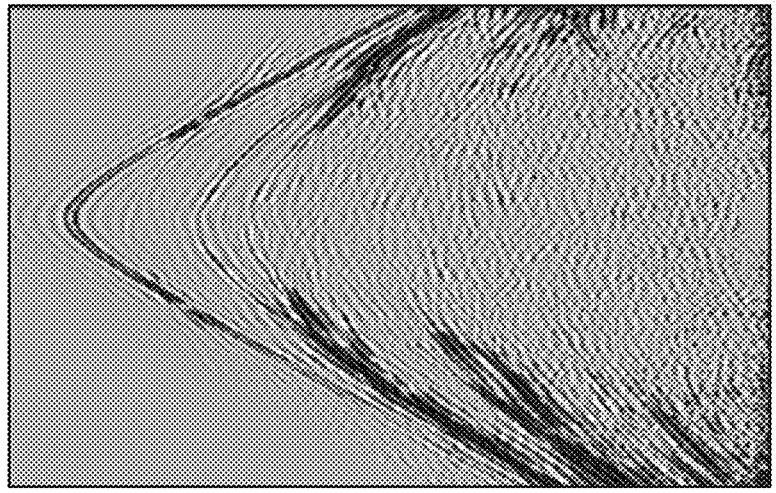

FIGS. 7A-C relate to manufactured low frequencies for a test node gather, including FIG. 7A being an illustration 700 of input high frequencies (3-6 Hz), FIG. 7B being an illustration 720 of original low frequencies (1 Hz-3 Hz), and FIG. 7C being an illustration 740 of manufactured low frequencies (1 Hz-3 Hz). Even with an advanced noise suppression workflow, the "ground truth" ultra-low frequencies may still seem dominated by noise for deeper events, highlighting one challenge regarding learning from field data. The manufactured low frequencies seem considerably less noisy (see FIG. 7C), exhibiting an excellent phase/amplitude match with the original low frequencies (see FIG. 7B) for many strong-amplitude events, but also lack signal in parts of the gather challenged by weak S/N. Depending on the objective function used by FWI, the phase information may become more important than the amplitude information.

Figure 8A:
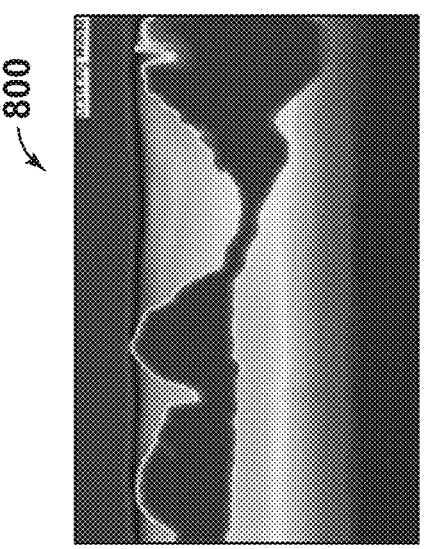
Figure 8D:
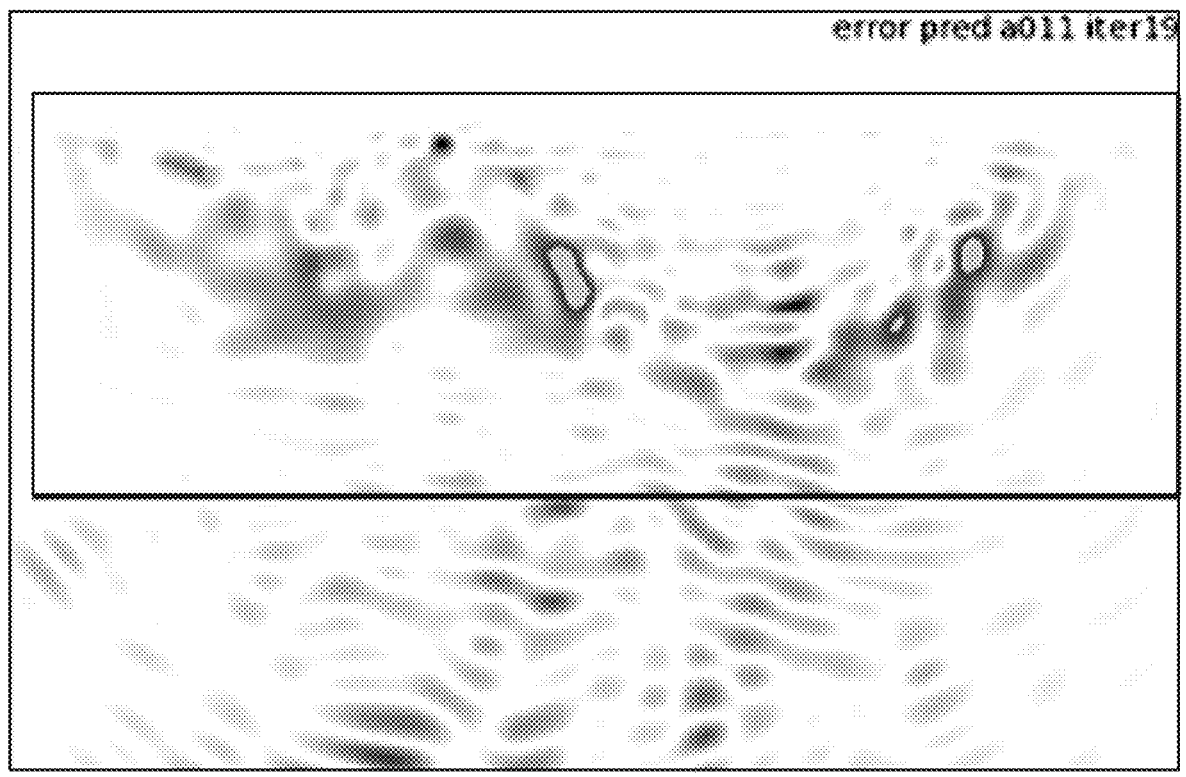

FIGS. 8A-D relate to a full wavefield inversion (FWI) response to original and manufactured low frequencies, including FIG. 8A being an illustration 800 of a starting Vp model, FIG. 8B being an illustration 820 of the FWI Vp inverted model (iteration 19) based on original low frequencies (with 2 Hz high-cut filter), FIG. 8C being an illustration 840 of the FWI Vp inverted model (iteration 19) based on manufactured low frequencies (with 2 Hz high-cut filter), and FIG. 8D being an illustration 860 of the difference between the FWI Vp inverted model in FIG. 8B and the FWI Vp inverted model in FIG. 8C.

Thus, FIGS. 8A-D compare the response of FWI to the manufactured and original ultra-low frequencies. To enable more accurate updates in the salt mini-basin, a 2 Hz high-cut filter may be applied on the input data. The difference between the two Vp models at convergence (iteration 19) illustrated in FIG. 8D indicates that there is an overall good match between the two solutions, except for updates in the salt flanks related to the challenge of accurately extrapolating weak diffractions that may be overwhelmed by noise. The good S/N at low frequencies provided by seabed seismic may allow the learning of an artificial bandwidth extension function that may be used to enhance geophysical datasets missing low frequencies. By training on a very sparse OBN set, which would be considerably less expensive to deploy, the trained sequence-to-sequence model may be applied to enhance towed-streamer data shot simultaneously. Though one may not use this as a substitute to real low frequencies, the manufactured low frequencies may nevertheless prove useful in the inversion of subsurface properties, such as in the same way interpolated traces may be useful in reducing migration swing and enhancing seismic image quality.

In this regard, the frequency-wavenumber representation of seismic data enables taking advantage of correlations existing between neighboring high-frequency slices to provide more "context" to extrapolate low frequencies. Although focused on the low-frequency band, the same framework may be used to extend the high-frequency band by learning, for instance, from shallow-tow streamer acquisition, as discussed above. Such mapping may be useful in manufacturing high frequencies for "broadband" deep-tow datasets.

In all practical applications, the present technological advancement must be used in conjunction with a computer, programmed in accordance with the disclosures herein. For example, FIG. 9 is a diagram of an exemplary computer system 900 that may be utilized to implement methods described herein. A central processing unit (CPU) 902 is coupled to system bus 904. The CPU 902 may be any general-purpose CPU, although other types of architectures of CPU 902 (or other components of exemplary computer system 900) may be used as long as CPU 902 (and other components of computer system 900) supports the operations as described herein. Those of ordinary skill in the art will appreciate that, while only a single CPU 902 is shown in FIG. 9, additional CPUs may be present. Moreover, the computer system 900 may comprise a networked, multi-processor computer system that may include a hybrid parallel CPU/GPU system. The CPU 902 may execute the various logical instructions according to various teachings disclosed herein. For example, the CPU 902 may execute machine-level instructions for performing processing according to the operational flow described.

The computer system 900 may also include computer components such as non-transitory, computer-readable media. Examples of computer-readable media include a random access memory (RAM) 906, which may be SRAM, DRAM, SDRAM, or the like. The computer system 900 may also include additional non-transitory, computer-readable media such as a read-only memory (ROM) 908, which may be PROM, EPROM, EEPROM, or the like. RAM 906 and ROM 908 hold user and system data and programs, as is known in the art. The computer system 900 may also include an input/output (I/O) adapter 910, a graphics processing unit (GPU) 914, a communications adapter 922, a user interface adapter 924, a display driver 916, and a display adapter 918.

The I/O adapter 910 may connect additional non-transitory, computer-readable media such as storage device(s) 912, including, for example, a hard drive, a compact disc (CD) drive, a floppy disk drive, a tape drive, and the like to computer system 900. The storage device(s) may be used when RAM 906 is insufficient for the memory requirements associated with storing data for operations of the present techniques. The data storage of the computer system 900 may be used for storing information and/or other data used or generated as disclosed herein. For example, storage device(s) 912 may be used to store configuration information or additional plug-ins in accordance with the present techniques. Further, user interface adapter 924 couples user input devices, such as a keyboard 928, a pointing device 926 and/or output devices to the computer system 900. The display adapter 918 is driven by the CPU 902 to control the display on a display device 920 to, for example, present information to the user such as subsurface images generated according to methods described herein.

The architecture of computer system 900 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 900 may include various plug-ins and library files. Input data may additionally include configuration information.

Preferably, the computer is a high performance computer (HPC), known to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM or other cloud computing based vendors such as Microsoft, Amazon.

The above-described techniques, and/or systems implementing such techniques, can further include hydrocarbon management based at least in part upon the above techniques, including using the one or more generated geological models in one or more aspects of hydrocarbon management. For instance, methods according to various embodiments may include managing hydrocarbons based at least in part upon the one or more generated geological models and data representations (e.g., seismic images, feature probability maps, feature objects, etc.) constructed according to the above-described methods. In particular, such methods may include drilling a well, and/or causing a well to be drilled, based at least in part upon the one or more generated geological models and data representations discussed herein (e.g., such that the well is located based at least in part upon a location determined from the models and/or data representations, which location may optionally be informed by other inputs, data, and/or analyses, as well) and further prospecting for and/or producing hydrocarbons using the well.

It is intended that the foregoing detailed description be understood as an illustration of selected forms that the invention can take and not as a definition of the invention. It is only the following claims, including all equivalents that are intended to define the scope of the claimed invention. Further, it should be noted that any aspect of any of the preferred embodiments described herein may be used alone or in combination with one another. Finally, persons skilled in the art will readily recognize that in preferred implementation, some or all of the steps in the disclosed method are performed using a computer so that the methodology is computer implemented. In such cases, the resulting physical properties model may be downloaded or saved to computer storage.

Described in the following paragraphs are further exemplary embodiments of the invention.

Embodiment 1: A computer-implemented method for bandwidth extension of geophysical data, the method comprising: accessing a machine learning model configured to identify one or more correlations between a first frequency band and a second frequency band; accessing measured seismic data from the first frequency band; and predicting frequency response in the second frequency band based on the accessed machine learning model and the measured seismic data.

Embodiment 2: The method of Embodiment 1, wherein the accessed machine learning model comprises a sequence-to-sequence model.

Embodiment 3: The method of any of Embodiments 1 or 2, wherein the sequence-to-sequence model identifies a sequence for the first frequency band, identifies a sequence for the second frequency band, and correlates the sequence for the first frequency band to the sequence for the second frequency band.

Embodiment 4: The method of any of Embodiments 1-3, wherein the sequence-to-sequence model comprises an encoder identifying the sequence for the first frequency band, a decoder identifying the sequence for the second frequency band, and a vector representation correlating the sequence for the first frequency band to the sequence for the second frequency band.

Embodiment 5: The method of any of Embodiments 1-4, wherein the encoder encodes correlations between frequency elements within the first frequency band into the vector representation; and wherein the decoder predicts a sequence of low frequencies conditioned on the vector representation from the encoder.

Embodiment 6: The method of any of Embodiments 1-5, wherein the encoder comprises one or more recurrent neural networks (RNNs); and wherein the decoder comprises one or more RNNs.

Embodiment 7: The method of any of Embodiments 1-6, wherein the one or more RNNs in the encoder are unidirectional; and wherein the one or more RNNs in the decoder are unidirectional.

Embodiment 8: The method of any of Embodiments 1-6, wherein the one or more RNNs in the encoder are bidirectional; and wherein the one or more RNNs in the decoder are bidirectional.

Embodiment 9: The method of any of Embodiments 1-8, wherein the encoder comprises a stacked long short-term memory (LSTM) architecture; and wherein the decoder comprises stacked LSTM architecture.

Embodiment 10: The method of any of Embodiments 1-9, wherein the first frequency band is higher than the second frequency band.

Embodiment 11: The method of any of Embodiments 1-10, wherein the first frequency band comprises a sequence of temporal frequencies; and further comprising transforming the sequence of temporal frequencies into frequency elements.

Embodiment 12: The method of any of Embodiments 1-11, wherein transforming comprises performing a Fourier transform on seismic data in order to move from time/space dimension into frequency/wavenumber (f-k) dimension of the frequency elements.

Embodiment 13: The method of any of Embodiments 1-9 and 11-12, wherein the first frequency band is lower than the second frequency band.

Embodiment 14: The method of any of Embodiments 1-13, wherein the accessed machine learning model identifies a set of frequencies as a sequence within at least one of the first frequency band or the second frequency band or between the first frequency band and the second frequency band.

Embodiment 15: The method of any of Embodiments 1-14, wherein the accessed machine learning model identifies a first set of frequencies within the first frequency band as a first set of frequencies sequence and uses the first set of frequencies sequence for predicting the frequency response in the second frequency band.

Embodiment 16: The method of any of Embodiments 1-15, wherein the machine learning model is trained using a training data generated using ocean bottom nodes; and wherein the measured seismic data comprises towed streamer data.

Embodiment 17: The method of any of Embodiments 1-16, further comprising preprocessing the towed streamer data to reduce differences between the training data and the towed streamer data.

Embodiment 18: The method of any of Embodiments 1-17, wherein preprocessing comprises one or both of wavefield redatuming or multiple attenuation.

Embodiment 19: The method of any of Embodiments 1-18, further comprising managing hydrocarbons in a subsurface based on the predicted frequency response in the second frequency band.

Embodiment 20: The method of any of Embodiments 1-19, further comprising:
generating an image based on the predicted frequency response in the second frequency band; and outputting the image on a display.

Embodiment 21: A non-transitory computer readable medium having stored thereon software instructions that, when executed by a processor, cause the processor to perform the method of any of Embodiments 1-20.

Embodiment 22: A system comprising a processor and a memory, the processor in communication with the memory, the memory having stored thereon software instructions that, when executed by the processor, cause the processor to perform the method of any of Embodiments 1-20.

REFERENCES

The following references are hereby incorporated by reference herein in their entirety:
Elboth et al., 2009, Flow and swell noise in marine seismic data, Geophysics 74: Q17-Q25.
Ovcharenko et al., 2019, Low-frequency data extrapolation using a feed-forward ANN, 80th EAGE Conference and Exhibition.
Sun, H. and L. Demanet, 2018, Low-frequency extrapolation with deep learning, SEG Technical Program Expanded Abstracts: 2011-2015.
Jin et al., 2018, Learn low wavenumber information in FWI via deep inception based convolutional networks, SEG Technical Program Expanded Abstracts 2018, 2091-2095.
Hu, W., Jin, Y., Wu, X. and Chen, J., 2019, A progressive deep transfer learning approach to cycle-skipping mitigation in FWI: $89^{th}$ Annual International Meeting, SEG, Expanded Abstracts, 2348-2352.

The invention claimed is:

1. A computer-implemented method for bandwidth extension of geophysical data, the method comprising:
accessing a machine learning model configured to identify one or more correlations between a first frequency band and a second frequency band, the machine learning model comprising a sequence-to-sequence model with an encoder that identifies a sequence for the first frequency band, a decoder that identifies a sequence for the second frequency band, and a vector representation correlating the sequence for the first frequency band to the sequence for the second frequency band;
accessing measured seismic data from the first frequency band; and
predicting frequency response in the second frequency band based on the accessed machine learning model and the measured seismic data.

2. The method of claim 1, wherein the encoder encodes correlations between frequency elements within the first frequency band into the vector representation; and
wherein the decoder predicts a sequence of low frequencies conditioned on the vector representation from the encoder.

3. The method of claim 2, wherein the encoder comprises one or more recurrent neural networks (RNNs); and
wherein the decoder comprises one or more RNNs.

4. The method of claim 3, wherein the one or more RNNs in the encoder are unidirectional; and
wherein the one or more RNNs in the decoder are unidirectional.

5. The method of claim 3, wherein the one or more RNNs in the encoder are bidirectional; and
wherein the one or more RNNs in the decoder are bidirectional.

6. The method of claim 3, wherein the encoder comprises a stacked long short-term memory (LSTM) architecture; and
wherein the decoder comprises stacked LSTM architecture.

7. The method of claim 2, wherein the first frequency band is higher than the second frequency band.

8. The method of claim 7, wherein the first frequency band comprises a sequence of temporal frequencies; and
further comprising transforming the sequence of temporal frequencies into frequency elements.

9. The method of claim 8, wherein transforming comprises performing a Fourier transform on seismic data in order to move from time/space dimension into frequency/wavenumber (f-k) dimension of the frequency elements.

10. The method of claim 7, wherein the first frequency band is lower than the second frequency band.

11. The method of claim 1, wherein the accessed machine learning model identifies a set of frequencies as a sequence within at least one of the first frequency band or the second frequency band or between the first frequency band and the second frequency band.

12. The method of claim 11, wherein the accessed machine learning model identifies a first set of frequencies within the first frequency band as a first set of frequencies sequence and uses the first set of frequencies sequence for predicting the frequency response in the second frequency band.

13. The method of claim 1, wherein the machine learning model is trained using a training data generated using ocean bottom nodes; and
wherein the measured seismic data comprises towed streamer data.

14. The method of claim 13, further comprising preprocessing the towed streamer data to reduce differences between the training data and the towed streamer data.

15. The method of claim 14, wherein preprocessing comprises one or both of wavefield redatuming or multiple attenuation.

16. The method of claim 1, further comprising managing hydrocarbons in a subsurface based on the predicted frequency response in the second frequency band.

17. The method of claim 1, further comprising:
generating an image based on the predicted frequency response in the second frequency band; and
outputting the image on a display.

* * * * *